US007206952B2

(12) United States Patent
Wilsser

(10) Patent No.: US 7,206,952 B2
(45) Date of Patent: Apr. 17, 2007

(54) DIGITAL WAKE-UP SIGNAL FROM SWITCH TRANSITION OF TWO ANALOG SIGNALS

(75) Inventor: Jens-Uwe Wilsser, Auburn Hills, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 597 days.

(21) Appl. No.: 10/748,972

(22) Filed: Dec. 30, 2003

(65) Prior Publication Data

US 2005/0146843 A1 Jul. 7, 2005

(51) Int. Cl.
*H01H 1/36* (2006.01)
*G06F 1/26* (2006.01)

(52) U.S. Cl. ...................... 713/323; 713/300; 713/310; 713/330; 200/61.27; 200/237; 200/550; 200/563; 338/172; 338/190; 338/200; 338/201

(58) Field of Classification Search ............ 200/61.27, 200/237, 292, 335, 550, 563, 564; 713/300, 713/310, 323, 330; 338/190, 200, 201, 196, 338/172, 176
See application file for complete search history.

(56) References Cited

U.S. PATENT DOCUMENTS 4,992,671 A 2/1991 Gille et al.
5,049,706 A 9/1991 DuRocher
5,412,170 A 5/1995 Hofmann et al.
5,453,588 A 9/1995 DuRocher et al.
5,473,809 A 12/1995 DuRocher et al.
5,610,378 A 3/1997 DuRocher et al.
5,724,719 A 3/1998 DuRocher et al.
5,852,867 A 12/1998 DuRocher
6,046,413 A 4/2000 Simonis et al.
6,534,733 B2 3/2003 Schwartz et al.

OTHER PUBLICATIONS

Motorola, Inc., *Motorola Semiconductor Technical Data*, No. 33889, Rev. 5.91, Apr. 1, 2003.

*Primary Examiner*—A. Elamin
*Assistant Examiner*—Nitin C. Patel
(74) *Attorney, Agent, or Firm*—Young Basile

(57) ABSTRACT

A digital wake-up signal is generated from an analog switch on a printed circuit board in which a ground trace and multiple conductive switch traces are bridged by a moveable contactor responsive to movement of an actuator. A resistor network is coupled to the switch traces and alternatingly connects the switch traces to two outputs to generate distinct analog voltage outputs. A logic gate determines when both outputs are at the same voltage corresponding to the contactor engaged between two adjacent switch traces and generates a wake-up command signal.

6 Claims, 9 Drawing Sheets

DIGITAL WAKE-UP SIGNAL FROM SWITCH TRANSITION OF TWO ANALOG SIGNALS

BACKGROUND

The present invention relates, in general, to devices in electronic circuits having a low power, sleep mode of operation and, more particularly, to wake-up circuits for use with such controls.

In many electronic control applications, an electronic or computer processor based controller has a low current, stand-by mode, also known as a "sleep mode", in which almost no functionality is provided. A wake-up signal is generated to bring the controller out of the sleep mode and into a normal, fully functional mode. To cause this mode change, a digital signal is needed in the form of an active high or low level signal. The trigger for this signal could be, for example, a change of a switch position. For example, in a controller for a motor vehicle, digital signals can be generated simply and inexpensively from an on/off switch change, such as the activation of a horn switch, movement of a turn signal switch, etc.

However, other switches in a vehicle generate analog outputs, such as resistor multiplexed outputs for controlling headlights, interior instrumental panel and interior dome lights, etc. A contactor moveable over a switch pad in response to user caused movement of an actuator couples different resistors in series to generate different voltage output signals depending upon the switch position. The voltage output is read by the controller, which implements the function specified by the switch based on the detected voltage level.

Since it is desirable to generate a digital wake-up signal from such analog switches, a common solution is to provide an additional conductor, contact bridge and other mechanical components in parallel to the analog switch signal circuit. However, this requires additional components as well as more area on the circuit board where space is usually at a premium.

Thus, it would be desirable to provide a digital wake-up signal from an analog switch signal which can be implemented in an existing circuit in an expedient manner with a minimum number of additional components.

SUMMARY

The present invention is a digital wake-up signal generation circuit which generates a digital wake-up command for waking up an electronic device from a sleep mode to an active mode in response to a detected movement of an analog output switch.

In one aspect, the invention includes a printed circuit board with a ground conductive trace and at least two switch conductive traces. A contactor bridges the ground and the switch conductive traces and moves in engagement between the switch traces by movement of an actuator coupled to the contactor. Resistor means are coupled between the switch traces for producing a distinct analog voltage output when each trace is connected to ground by the contactor. The switch traces are alternatingly coupled through the resistor means to first and second outputs and alternate between defined resistor values and an open circuit. Means are connected to the first and second outputs to generate a wake-up command signal when both of the outputs are in a low voltage state.

In another aspect, the invention is a method for switching an electronic device having sleep and active states from a sleep state to an active state by generating a wake-up signal from a digital wake-up signal generating device, the method includes the steps of, providing a contactor bridging the ground and the switch conductive traces moveable in engagement between switch traces by movement of an actuator coupled to the contactor, providing a resistor means coupled between the switch traces and producing a distinct analog voltage output when each switch trace is connected to ground by the contactor, the switch traces alternatingly coupled through the resistor means to first and second outputs;

means, connected to the first and second outputs, for generating a wake-up command signal when both of the outputs are in a low voltage state.

The present invention uniquely provides a digital wake-up signal from analog output switches. The digital signal is generated without requiring significant modifications to the analog signal output. Specifically, the unique digital wake-up signal generation means of the present invention eliminates the need for any additional wake-up signal, additional switch contacts, additional mechanical components and at the same time reduces the needed surface area at the switch or contact pads.

The present invention also allows lower tolerances at the mechatronic interface as if a pure digital signal is needed.

BRIEF DESCRIPTION OF THE DRAWING

The various features, advantages and other uses of the present invention will become more apparent by referring to the following detailed description and drawing in which.

DETAILED DESCRIPTION

Figure 1:
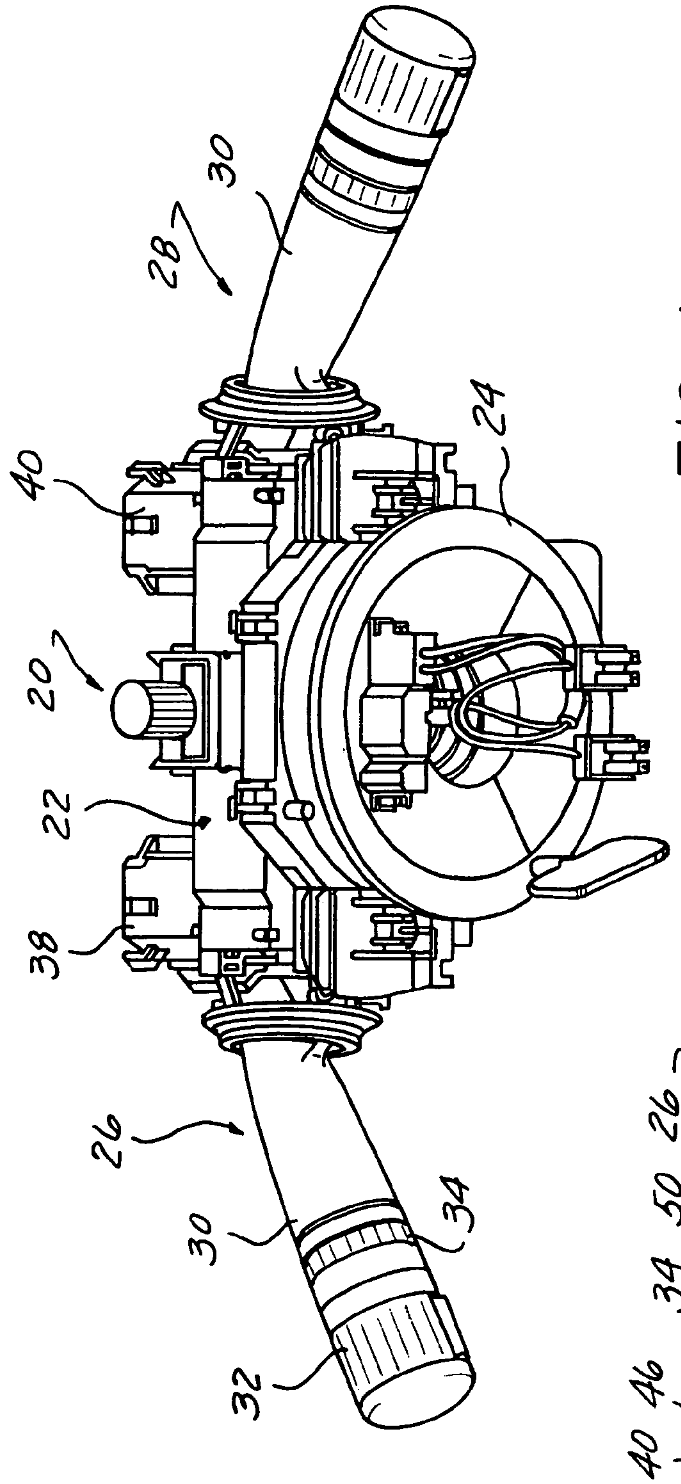
FIG. 1 is a perspective view of a vehicle steering column stalk switch assembly which includes analog switches incorporating the present invention.
Figure 2:
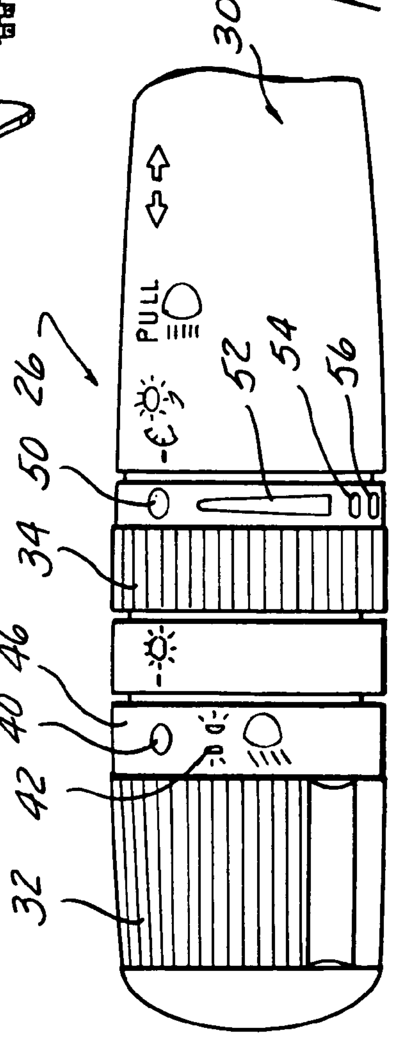
FIG. 2 is an enlarged front elevational view of one stalk switch shown in FIG. 1.
Figure 3:
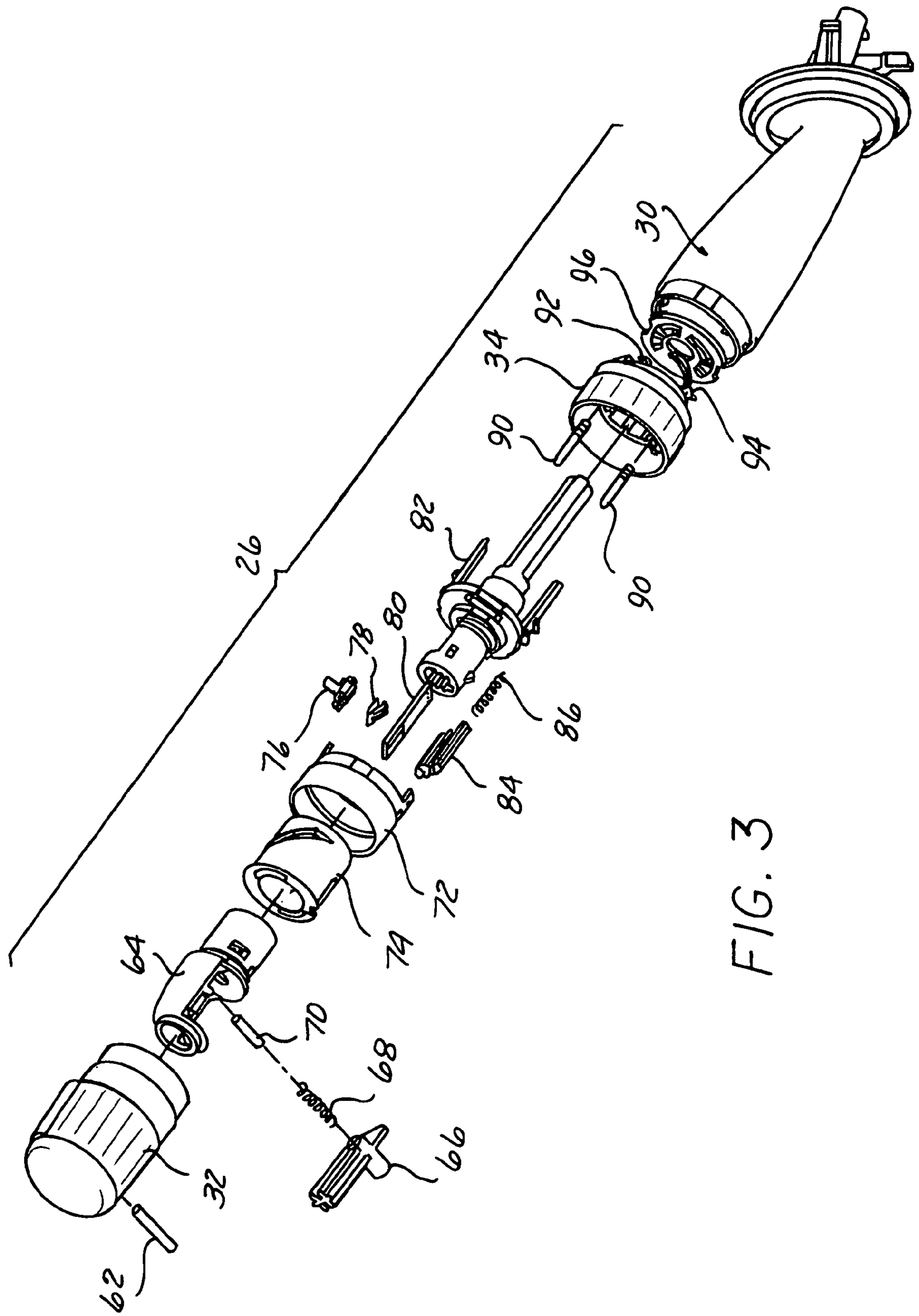
FIG. 3 is an exploded perspective view of the stalk switch shown in FIG. 2.

Refer now to the drawing, and to FIGS. 1–3 in particular, there is depicted one example of a steering column switch assembly 20 which may be used to implement the features of the present invention.

By way of example only, the steering column switch assembly 20 includes a housing 22 that supports a steering column angle sensor 24 as well as mounting features to enable the housing 22 to be fixedly secured about a vehicle steering column, not shown. Individual stalk levers, with two stalk switch assemblies 26 and 28 being depicted by way of example only, are each coupled to switch housings 38 and 40, respectively, which are in turn mounted in the steering column housing 22. Each stalk lever 26 and 28, with stalk lever 26 being described hereafter in detail by way of example only, includes one or more switch actuators 32 and 34, by example, which are rotary or linearly slidable members mounted on the housing 30 of the stalk lever 26. Internal components, as described hereafter and shown in FIG. 3, are mounted within the housing 30 of the stalk lever 26 and convert movement of each actuator 32 and 34 into rotary or linear movement of a switch contact or contactor across contact pads to generate output signals coupled to the switch housings 38 or 40 to control various vehicle electrical devices, such as vehicle headlights in the case of the actuator 32 and the vehicle interior lights and instrument panel illumination by the actuator 34. Further details concerning the overall construction of the stalk levers 26 and 28, the steering column housing 22 and the individual stalk switch housings 38 and 40 can be had by referring to U.S. Pat. Nos. 5,049,706 and 5,405,588, which are assigned to the assignee of the present invention. The contents of both applications with respect to the mounting and construction of steering column switch assemblies are incorporated herein in their entirety.

Referring now to FIG. 2, there is depicted an enlarged view of the stalk lever 26. The lever 26 includes a housing 30 that supports the rotary cap or actuator 32. The cap or actuator 32 is moveable between a plurality of distinct, angular positions including a headlight "off" position 40, parking lights "on" 42, headlights "on" 44 and an automatic headlight control feature 46 based on ambient light.

The actuator 34 is configured, by example only, for controlling the interior vehicle compartment dome light and instrument panel illumination. The actuator 34, which is also depicted as being a rotary member mounted on the lever 26 is also moveable between an "on" position 50, a variably selectable interior light and instrument panel illumination dimming control position 52, a parade mode position 54 and an interior dome light only control position 56.

The interior construction of the lever 26 is shown in FIG. 3. It will be understood that this illustration and the following functionality and operation of the lever 26 is by way of example only. It will also be understood that conversion of rotary movement of one of the actuators 32 or 34 to linear sliding movement of a controlled contact bridge or contactor can be replaced by rotary movement of the contact bridge across a circular or arcuate circuit board.

The lever 26 includes a suitably formed end mount or plunger arrangement, similar to that in U.S. Pat. Nos. 5,049,706 and 5,453,588 referenced above, which controls switch actuators and/or contacts in the associated switch housing 38. The housing 30 also supports the remaining components shown in FIG. 3 of the entire stalk assembly 26. By way of example only, the actuator 32 is in the form of an end cap which is fixed to an internally mounted component by means of a fastener, or road pin 62. The actuator 32 includes a detent cap 64 which supports a detent 66 by means of a spring 68 and plunger 70. This enables the actuator 32 to provide a push in and release function to control a selected vehicle function.

A static ring 72 is fixedly mounted to the housing 30 and supports a rotatable cam 74. The cam 74 controls a headlight slider 76 which carries a contactor or bridge contact 78 for linear movement upon rotation of the actuator 32 via the cam 74. The contactor 78 linearly moves along a printed circuit board 80 between contact with various contact pads or traces, as described hereafter.

The printed circuit board 80 is fixedly carried on an intermediate housing 82. By example only, a slider 84 for controlling front fog lights is also mounted within the static ring 72 and controlled by rotary movement of the cam 74 via the actuator 32. A return spring 86 biases the slider 84 to a return or home position.

A spring biased plunger assembly 90 is mounted in the housing of a rotary actuator 34.

A contactor 92 carrying a bridge contact 94 is fixedly mounted on the actuator housing 34 and is rotated by rotation of the actuator 34. The bridge contact 94 is positioned to slide across a printed circuit board 96 fixedly mounted on one end of the housing 30.

Figure 4:
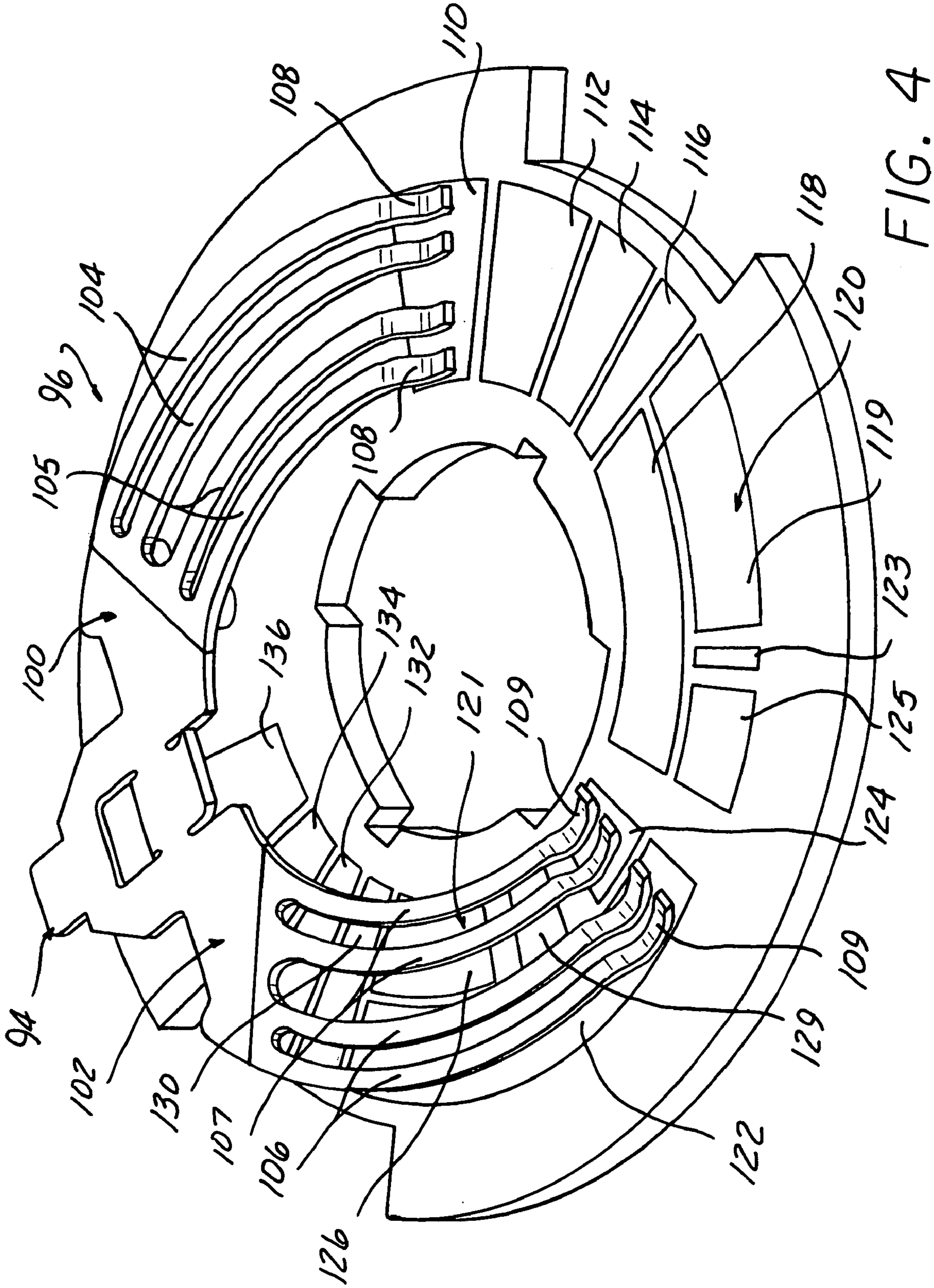
FIG. 4 is a perspective view of one aspect of an analog switch.

As shown in FIG. 4, the bridge contact 94 is formed, by way of example only, from stamped or otherwise shaped conductive material, such as copper or copper alloy. The bridge contact 94 includes first and second contact arms 100 and 102, respectively. Each contact arm 100 and 102 includes two or more pairs of bifurcated arms 104 and 105, and 106 and 107, respectively, each of which terminates in a contact surface 108 and 109 respectively. The contact surfaces 108 and 109 are positioned to slide across and contact individual contact pads or conductive traces carried on the circuit board 96.

It will be understood that the following description of the contact pads or traces on the circuit board 36 as forming two groups is by way of example only in order to provide a plurality of distinct outputs from the contact pads. More or less contact pads may be employed on the printed circuit board 96 as needed to provide different output voltages to identify different vehicle control functions.

Figure 5:
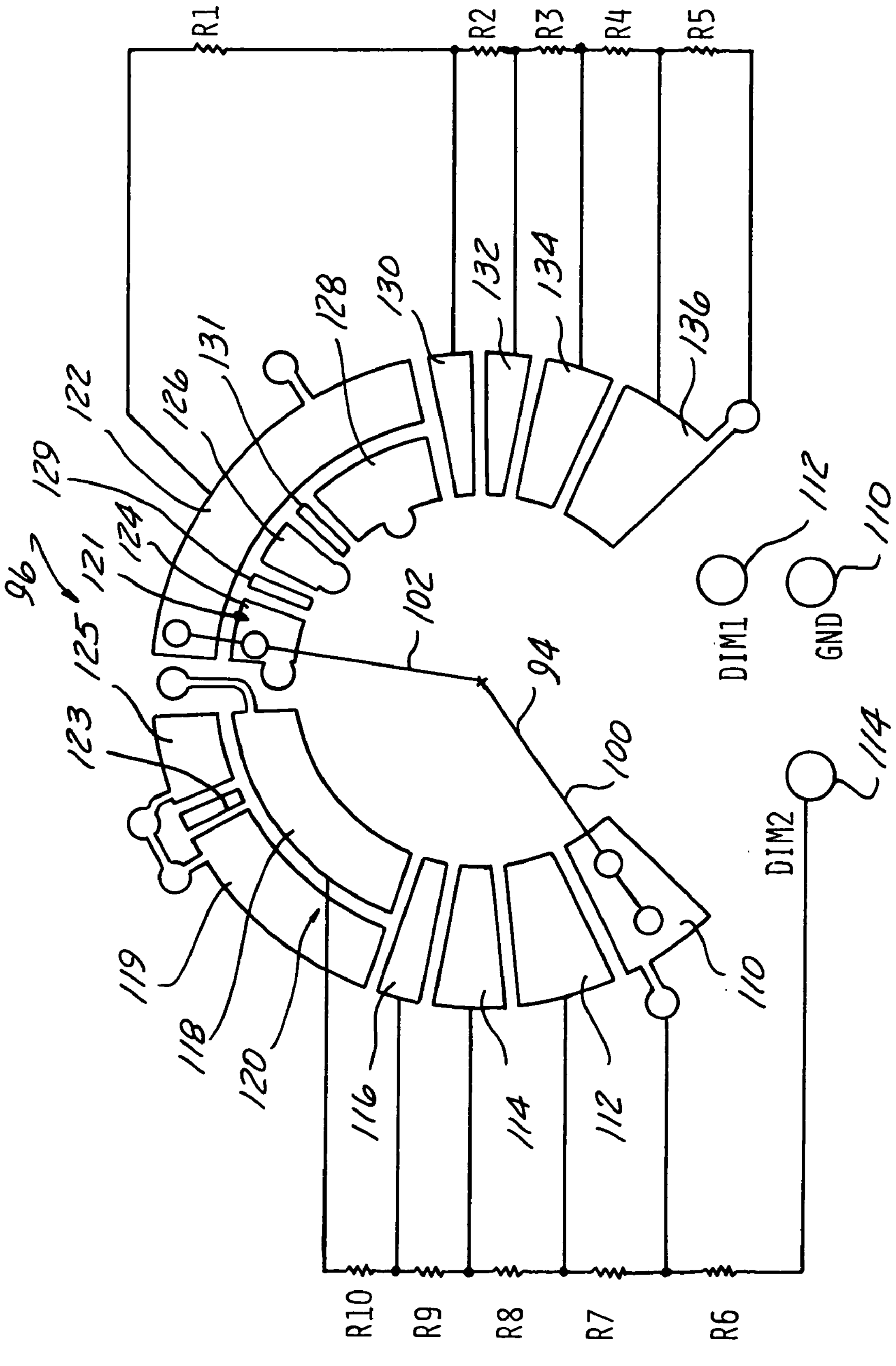
FIG. 5 is a pictorial schematic representation of the analog switch contact pad shown in FIG. 4.

Thus, as shown in FIGS. 4 and 5, the printed circuit board 96 is provided with three main connections including a ground terminal or connection 110, a connection 112 labeled DIM 1 and a connection 114 labeled DIM 2. The three main connections 110, 112 and 114 are connected through a multiplexed resistor networks to individual contact pads 110, 112, 114, 116, 118, 120, 121, 122, 126, 128, 130, 132, 134 and 136. The contact arms 104, 105, 106 and 107 of the contact bridge 94 span the individual contact pads as the contact bridge or contactor 94 is rotated by rotation of the actuator 34.

The main connection 112 or DIM 1 is connected by a multiplex resistor network containing resistors R1, R2, R3, R4 and R5 to the contact pads 122, 130, 132, 134 and 136. Similarly, the DIM 2 terminal connection 114 is connected by a separate multiplex resistor network including resistors R6, R7, R8, R9 and R10 to contact pads 110, 112, 114, 116 and 118. The ground connection 110 is connected via circuit board tracings to the ground pads 120 and 121.

As shown in FIG. 4, and symbolically in FIG. 5, the arms 100 and 102 of the contactor or bridge 94 spans and engages four separate contact pads in each switch position.

As the bridge 94 traverses the various contact pads in either direction of movement, more or less of the resistors in each of the resistor networks will be connected in series between ground and the DIM 1 or DIM 2 terminals. This will cause a change in the voltage drop across the resistor network and vary the voltage at the DIM 1 and DIM 2 terminals 112 and 114.

By way of example only, the position of the arms 104 and 106 of the contact 94 shown in FIGS. 4 and 5 corresponds to a parade lighting position. Rotation of the bridge in a clockwise direction causes one set of contact points 109 to traverse the arcuate contact pad 122. The adjacent pair of contact points 109 on the contact arm 102 traverses the ground pads 124 and 126. An intermediate wear pad 129 is interposed between the ground pads 126 and 127 and is separated by insulating material from the adjacent pads 124 and 126. Traversal of the contact arms 107 over the pad 129 causes an interruption in the ground signal as described hereafter.

As the contact points 109 traverse the ground contact pads 126, 124 and 127, the opposite pair of contact points 108 on the contact arms 104 and 105 traverse the individual contact pads 110, 112, 114, 116, 118 and 120. This connects the resistor network R1–R5 associated with the contact pads 110, 112, 114, and 116 to ground via the contact points 109 on the arms 107. Each of the contact pads 110, 112, 114 and 116 and even 118 corresponds to a different position of the dimmer actuator 34. Contact pad 110, for example, corresponds to the parade light position.

Contact pad 112 corresponds to the interior dome light "on" state. Contact pads 114, 116 and pads 130, 132 and 134 correspond to five positions of dimming applied to the instrument panel illumination circuit. As the contactor 94 traverses the printed circuit board 96, one of the pair of contact points 108 on the arms 105 will engage the ground trace or pad 120. At the same time, the opposed contact surfaces 109 on the contact arms 107 engage one of the contact pads 130, 132, 134 and 136. This maintains the ground connection to the DIM 1 and DIM 2 terminals 112 and 114 through the associated resistor network. However, the resistor network R6–R10 associated with the contact pads 130, 132, 134 and 136 is now being employed to vary the voltage signal at the DIM 1 terminal 112.

Contact pad 136 in the illustrated example corresponds to an "off" headlight position. It should be noted that as the bridge 94 continues to be rotated in a clockwise direction in the orientation shown in FIGS. 4 and 5, the contact points 108 will disengage from the ground trace 119 and ride over the insulated portion of the printed circuit board 96 thereby temporarily interrupting the ground connection. Pad 123 is provided as a wear pad and is not connected to ground thereby maintaining interruption of the ground signal. This interruption of the ground signal continues until the contact points 108 re-engage the grounded contact pad 125. The ground interruption between the grounded contact pads 119 and 125 corresponds to movement of the associated pair of contact points 109 on the contact arm 106 between the contact pads 134 and 136 caused by rotation of the actuator 34 between the first dimmer position and the "off" position.

Rotation of the actuator 34 and thereby the bridge 94 in an opposite or counterclockwise direction in the orientation shown in FIGS. 4 and 5 is also possible with the same interruption of the ground signal as described above.

It is possible, as shown in FIG. 5, to add an optional third ground interruption point by interposing a break in the ground path between ground pads 126 and 128. Wear surface 131 is interposed in the interrupted path to prevent wear of the contact points. However, the surface 131 is not connected to ground.

Figure 6:
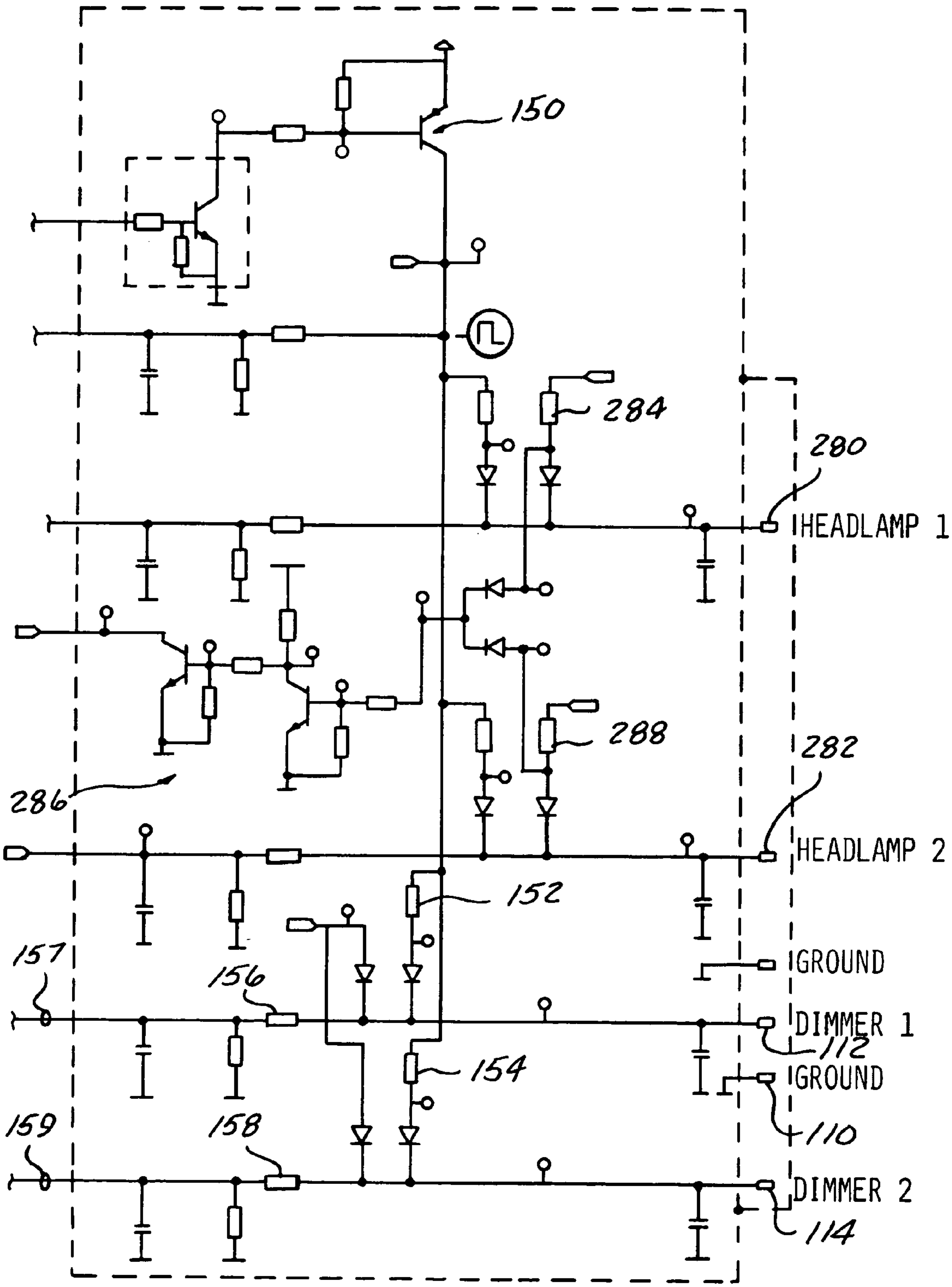
FIGS. 6, 7 and 8 are schematic diagrams of the circuitry employed in the present invention.
Figure 8:
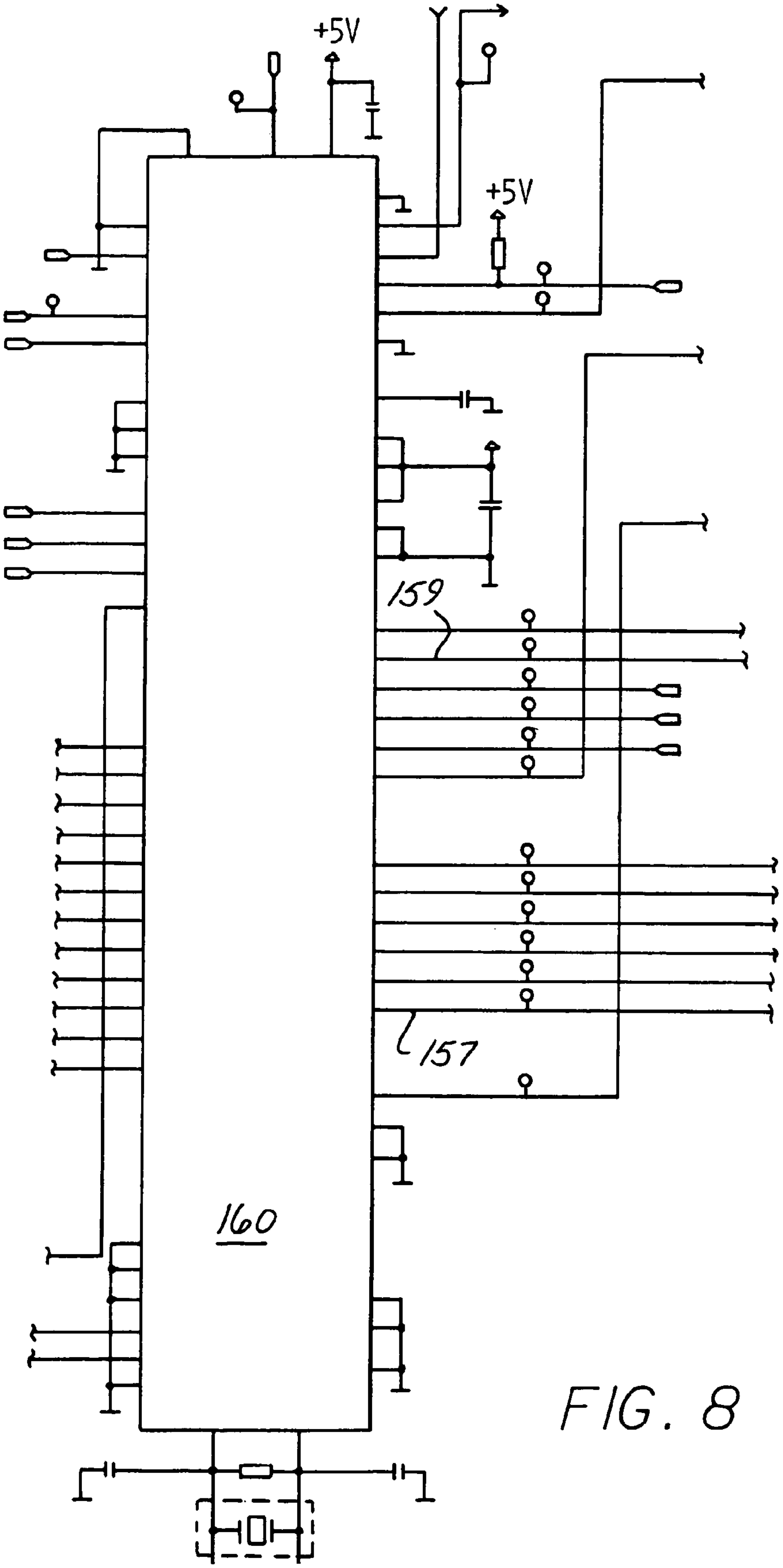

Referring now to FIG. 6, the DIM 1 and DIM 2 signals 112 and 114 are input to a control circuit. The circuit contains two separately active portions. The first portion receives a signal labeled U_STALKL_ON, which turns on transistor 150 and connects the voltage through resistors 152 and 154 to the DIM 1 and DIM 2 terminals 112 and 114 from the system battery. These signals pass through resistors 156 and 158 as separate Dimmer 1 (157) and Dimmer 2 (158) signals input to the vehicle controller for controlling the intensity of the interior lighting. The voltage changes caused on the DIM 1 and DIM 2 signals through the resistor networks causes different voltages to be input to the controller 160 as shown in FIG. 8. The controller 160 will interpret the voltages as separate signals to identify a particular illumination level or state. The controller 160 will then control the on/off and dimming state of the associated interior vehicle lighting. This state is the active state of the vehicle in which full power is supplied to all of the electrical components.

Figure 7:
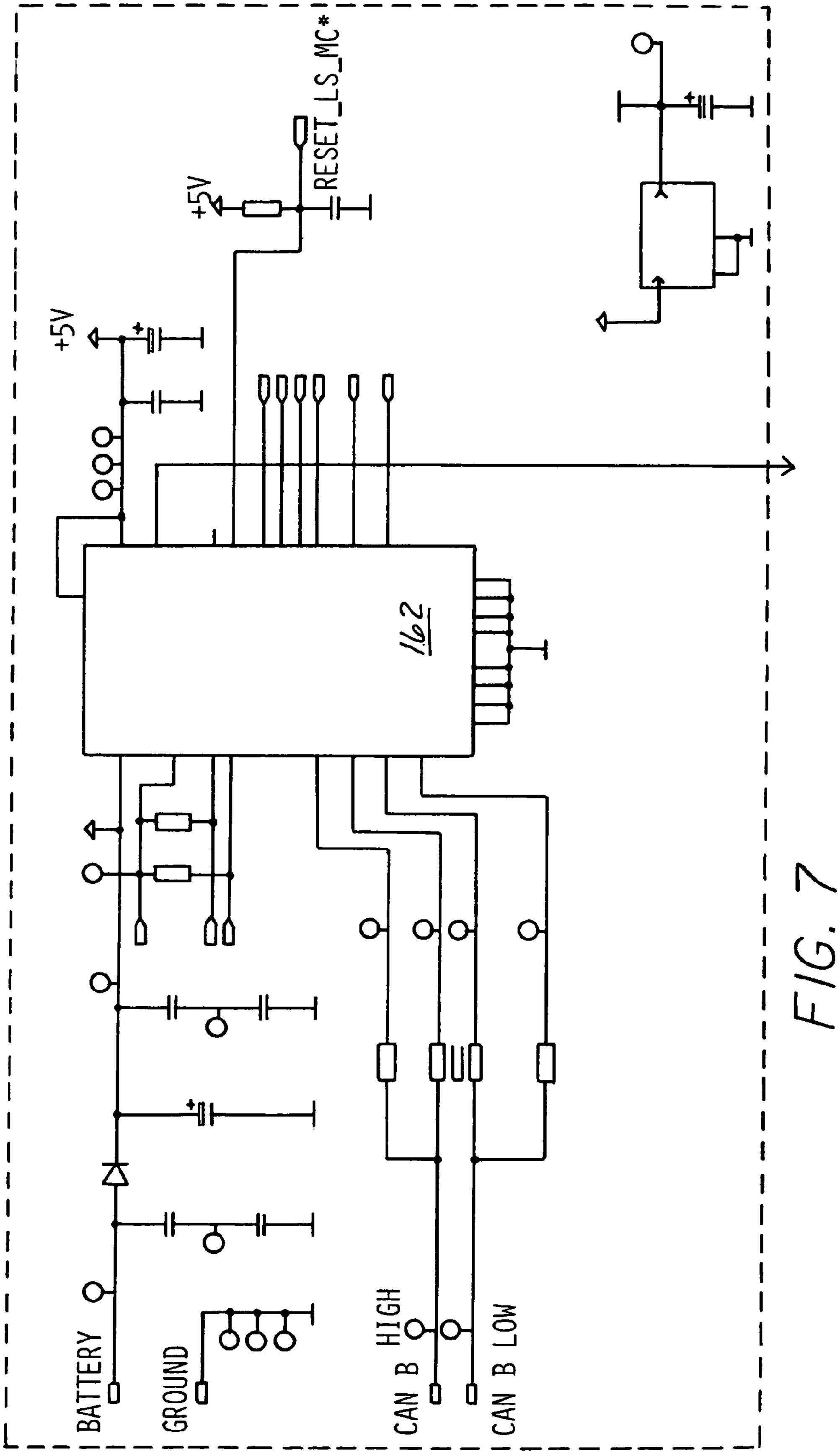

Under certain conditions, such as by removing the key from the ignition switch, for example, an internal sleep circuit in the controller 160 will eventually place the controller 160 in a sleep or low power mode after a predetermined set time. When in the "sleep" mode, the $U_{13}$ $STALKL_{13}$ ON signal is off thereby causing transistor 150 to open and removing the system voltage from the DIM 1 and DIM 2 signal lines. In addition, the integrated circuit 162 (FIG. 7) will power the analog signals lines DIM 1 and DIM 2 through HS1. This enables the DIM 1 and DIM 2 signals to be routed to a signal terminal L1.

The L1 signal is input to a system basis chip light integrated circuit, Model No. PC 33889 sold by Motorola, Inc., for example. One of the functions provided by the integrated circuit 162 is to turn on the controller 160. The circuit 162 is programmable so as to recognize a wake-up signal upon a low voltage to high voltage signal transition on Line L1. This low to high transition, which represents a digital change of state, is generated when the ground is interrupted in the DIM 1 and DIM 2 signals from the printed circuit board 96. This ground interruption coincides with the change of state of the actuator 34 from "off" to dimming, from dimming to parade, or from parade to dome light control or vice versa.

A high pull-up resistor will maintain the L1 signal in a low state as long as ground is connected to the resistor network. An interruption can be caused by either an interruption of the ground trace (see FIG. 9) or an interruption of all analog switch signal traces (see FIG. 10) that are connected, as shown in this example, to the same wake-up input L1, see FIG. 7. However, as soon as the ground is removed, the DIM 1 or DIM 2 signals 112 and 114 go high which switches L1 from a low to high voltage state. This switch transition is recognized by the circuit 162 as a wake-up command. The circuit 162 then turns on the controller 160 to the fully activated mode.

Figure 9:
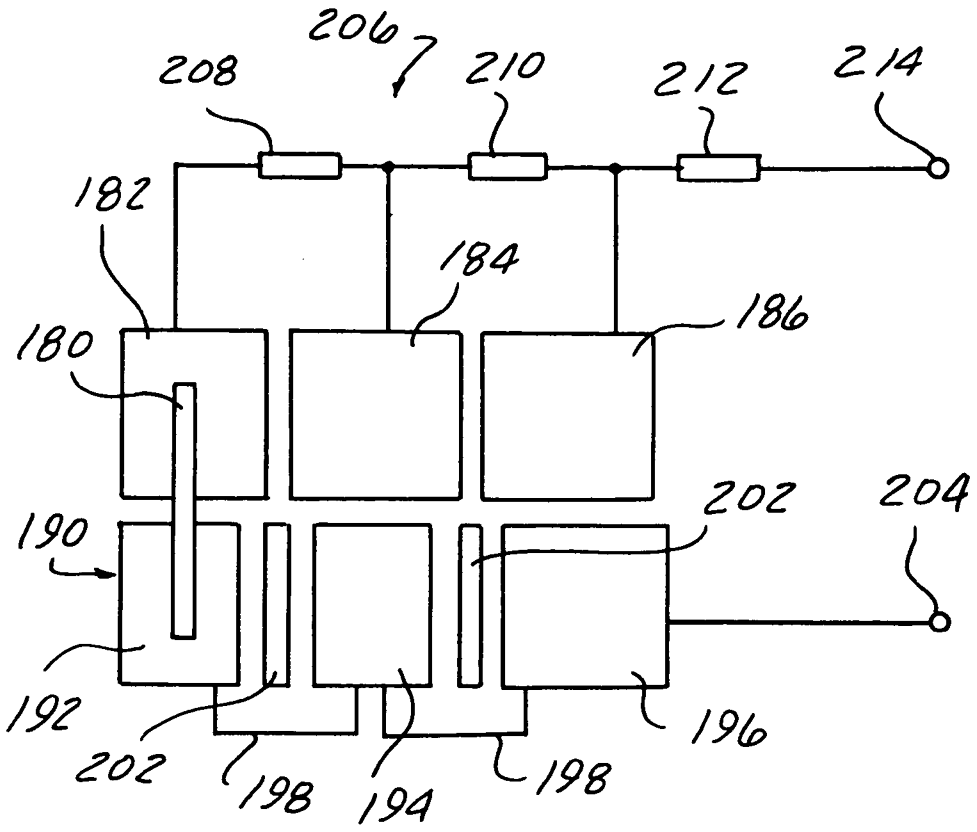
FIG. 9 is a pictorial schematic representation of an alternate analog switch, similar to the analog switch shown in FIG. 4, but having a linear contact bridge movement between switch positions.

Referring now to FIG. 9, the above described concept using the generation and use of a ground interruption to generate a digital signal from an analog switching signal in a rotary switch can also be applied to a linearly moveable switch containing a linearly moveable contactor or contact bridge 180. The bridge 180, which may be formed the same as the contactor 94, is linearly moveable by a suitably formed actuator on a stalk lever between a plurality of positions including individual contact switch pads 182, 184 and 186. A ground pad 190 is provided with two interruptions thereby forming three ground pads 192, 194 and 196 which are interconnected by jumpers 198. The interruptions include non-grounded wear pads 202. The ground pads 192, 194 and 196 are connected to ground terminal 204.

As shown in FIG. 9, a resistor multiplex network 206 formed of resistors 208, 210 and 212 is connected across the contact switch pads 182, 184 and 186 and in series to an output terminal 214 which would be similar to the DIM 1 terminal.

In the position of the bridge 180 shown in FIG. 9 bridging the contact pad 182 and the ground pad 192, all three resistors 208, 210 and 212 are connected in series between the ground terminal 204 and the output terminal 214. This creates a first voltage level at the terminal 214. When the bridge 180 is moved from the switch pad 182 to the switch pad 184, the ground is interrupted when one arm of the bridge 180 is between the ground pads 192 and 194. This removes ground from the output 214 causing the output 214 to immediately surge to a high voltage. When the bridge 180 engages the contact pad 194, the ground is reapplied and only resistors 210 and 212 are connected in series with the output 214 thereby creating a second output voltage level different from the first output voltage. The ground interruption between the ground pads 194 and 196 and the connection of only a single resistor 212 to create a third distinct voltage at the output terminal 214 similarly occurs as the bridge 180 moves between the pads 184 and 194 and the pads 186 and 196.

Figure 10:
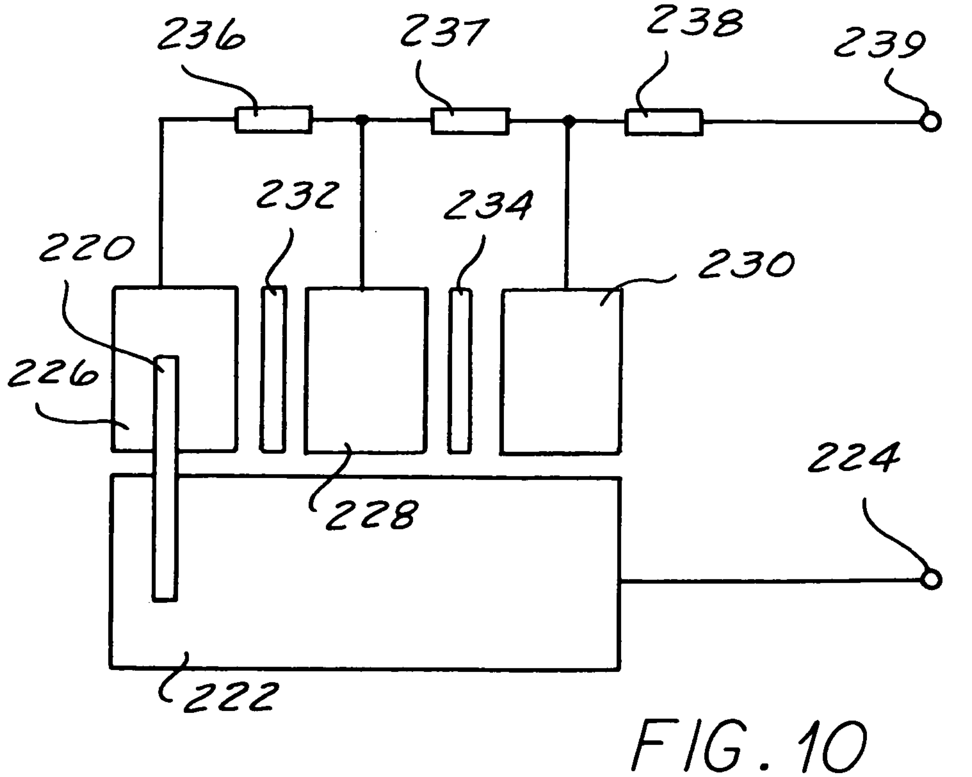
FIG. 10 is a pictorial schematic diagram of an alternate digital wake-up signal generation circuit from an analog signal.

The present invention also covers the generation of a digital signal from low to high or high to low from an analog signal by a linear moveable contactor 220 shown in FIG. 10. In this aspect, a continuous, uninterrupted ground pad 222 is connected to ground terminal 224. The other arms of the contactor 220 are moveable between switch pads 226, 228 and 230. The switch pads 226, 228 and 230 are separated from each other by an insulated space on a circuit board which may or may not include a non-electrically conductive wear pad 232 and 234. The non-conductive space is wide enough to receive the contactor 220 without the contactor 220 contacting either of the adjacent switch traces or pad. This differs from the conventional switch trace spacing which creates a make before break switching during movement of the contactor.

The distinct zero voltage signal on terminal 239 will be interpreted as a wake-up command and can be inverted to a "high" level signal to the circuit 162.

Figure 11:
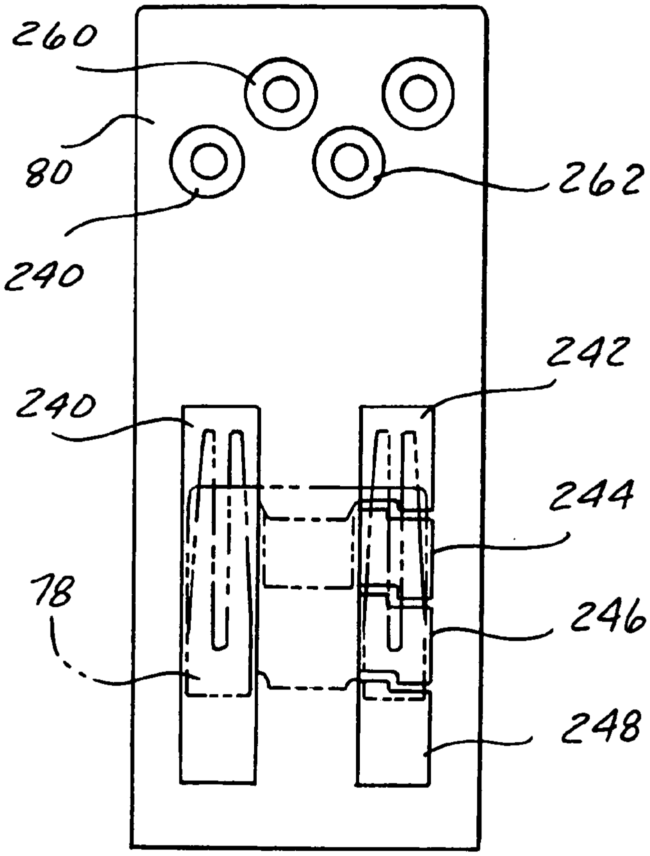
FIG. 11 is a plan view of an analog switch implementing the wake-up signal generation according to the present invention.
Figure 12:
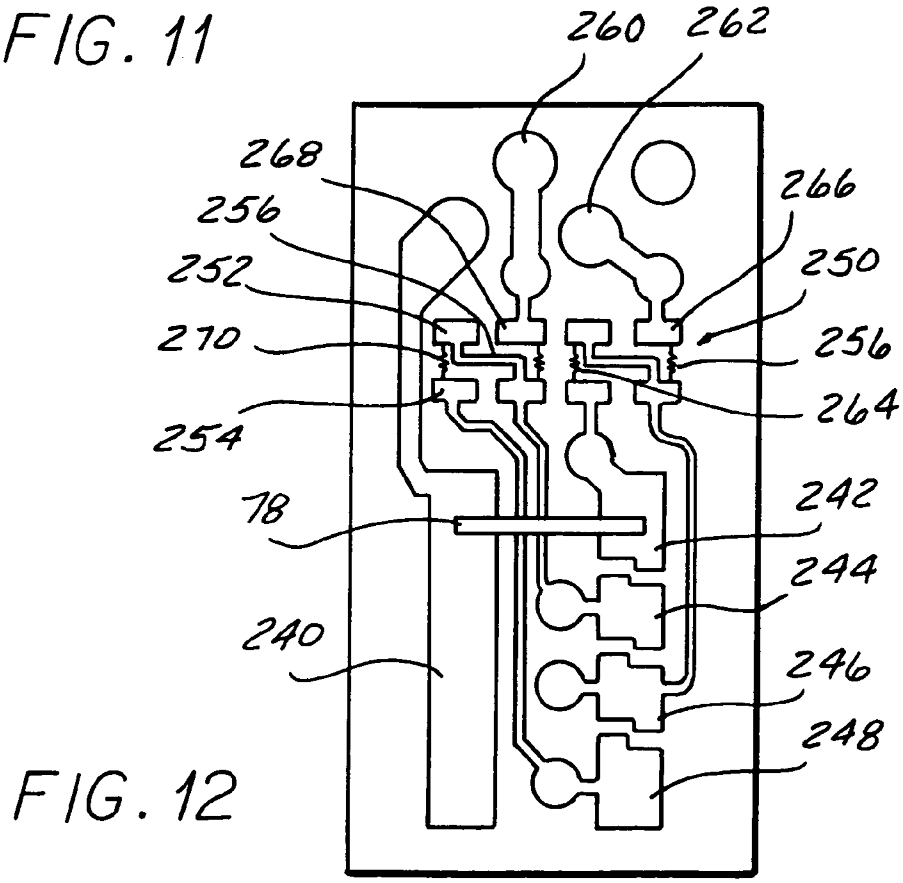
FIG. 12 is a schematic diagram of the contact pad of the analog switch shown in FIG. 11.

Referring now to FIGS. 11 and 12, the printed circuit board 80 shown in FIG. 3 has its associated contactor 78 depicted symbolically in FIG. 12 as linearly moveable over a continuous ground pad or trace 240 and a plurality, such as four by way of example only, of distinct contact switch pads 242, 244, 246 and 248. Each of the switch pads 242, 244, 246 and 248 is connected to a resistor network 250 in which four resistors 264, 266, 268 and 270 250 are each connected between separate pads 252 and 254. Two pads in adjacent pairs of pads 252 and 254 interconnected by a jumper trace 256 so as to place the resistors 264, 266, 268 and 270 in a connection state where one or two resistors are connected to a first analog signal terminal 260, or one or two resistors are connected in series with a second analog signal terminal 262. For example, with the contactor 78 in the position shown in solid in FIG. 12, the switch pad 242 is connected to ground thereby enabling a signal to be generated through resistors 264 and 266 at a predetermined voltage at the second analog signal terminal 262. At the same time, the first analog signal terminal 260 shows an open circuit. Movement of the contactor 78 to the second position into contact with the switch pad 244 switches the resistor connection such that only a single resistor 268 is connected to the first analog signal terminal 260. At this time, the second analog signal terminal 260 shows an open circuit. Continued sliding movement of the contactor to the third switch pad 246 connects both resistors 264 and 266 in series with the second analog signal terminal 262 creating a different output voltage than the voltage associated when the contactor engaged the switch pad 242. The analog signal terminal 260 shows an open circuit at this time.

Movement of the contactor 78 into engagement with the fourth switch pad 248 places resistors 268 and 270 in series with the first analog signal terminal 260 creating a different voltage from that generated when the contactor 78 contacted the second switch pad 244. The second analog signal terminal 260 shows an open circuit at this time.

In a headlight control function, the switch pad 244 can be associated with an "off" headlight state. Switch pad 244 corresponds to the parking lights being activated, switch pad 246 corresponds to the headlights being activated, and switch pad 248 corresponds to an auto light function based on ambient light sensors.

For example, if resistor 270 and resistor 264 are 649 ohms and resistors 266 and 268 are 221 ohms.

A unique feature of the aspects of the invention shown in FIGS. 11 and 12 is that the switch pads 242, 244, 246 and 248 are arranged with overlapping portions for a make before break switch arrangement. With a suitably formed contactor 78, the contactor 78 when moving from the switch pad 242 to the switch pad 244, for example, will actually contact and bridge the adjacent portions of the switch pads 242 and 244 for a brief instant. This will cause the first and second at the terminals outputs 260 and 262 to alternate voltage levels based on whether or not any or which one or two of the resistors are connected between ground and the associated switch pads.

For example, when the contactor 78 is in the position shown in FIG. 12 in contact with the first switch pad 242, as the output of the first switch pad 242 is connected to the second analog signal terminal 262, the first signal terminal 260 is open. As the contactor 78 transitions to the second switch pad 244, for a brief instant both of the first and second switch pads 242 and 244 will be connected to ground. In the first position, both resistors 264 and 266 will be connected in series between ground, the first switch pad 242 and the second analog signal terminal 262 creating a first voltage at the second signal terminal 262. As the contactor 78 transitions to the second switch pad 244, for a brief instant, both resistors 264 and 266 will remain in series with the second signal terminal 262 while ground will be connected to the second switch pad 244 thereby placing resistor 268 in series with the first signal terminal 260 and placing a second voltage level signal on the first signal terminal. Continued sliding movement of the contactor will cause the contactor 78 to completely separate from the first switch pad 244 thereby changing the voltage level on the second signal terminal 262 to an open voltage as switch pad 242 is only connected to the first terminal 260.

The same sequence occurs as the contactor moves between the second and third switch pads 244 and 246 and between the third and fourth switch pads 246 and 248. In each transition, due to the making before breaking arrangement of the adjacent portions of the switch pads 244, 246 and 248, one or more resistors will be connected in series with the first and second signal terminals 260 and 262 creating different distinct voltages on the signal terminals 260 and 262.

These voltage signals from the first and second terminals 260 and 262 are input to the headlight 1 and headlight 2 terminals 280 and 282, respectively, in the circuit shown in FIG. 6. As before, the transistor 150, when closed, indicates an active controller state. Any signals on terminal LO are disregarded as the actual voltage outputs from the headlight signals 280 and 282 are passed directly through the circuit to the controller 160.

However, when the controller 160 is turned off, the transistor 150 is open. The wake-up circuit 162 generates a signal HS1 which can be a periodic square wave signal. This signal, as shown in FIG. 6, is input through a first resistor 284 to a logic circuit which forms an OR logic gate 286, for example. The similar HS1 signal is also connected through a similar pull-up resistor 288 to the second headlight signal 282 and also to the OR gate 286. The output of the OR gate 286 is the signal labeled L0. The signal L0 is normally at a high voltage level when input to the wake-up circuit 162. However, when the HS1 signal is active from the wake-up circuit 162, the voltage states from the headlight signals 280 and 282, as described above, will be input to the OR gate 286 and switch the state of the L0 signal from high to low only when both signals are present, such as at each contactor 78 transition between two switch pads.

When this switch transition is recognized by the integrated circuit 162, it will see it as a wake-up event, so that the circuit 162 will turn on the controller 160 from the sleep mode into the fully active mode. The output of the OR gate 286 to the L0 terminal switches the state of the terminal from high to low only when non open voltage signals, high pull-up resistor, low resistor value out of first and second terminals 260 and 262 in FIG. 12 are applied to both of the terminals 280 and 282 at the same time during the make before break transition movement of the contactor 78 between two adjacent switch pads. Thus, the transition of the actuator 32 between any two positions on the housing 30 will drive the L0 signal low which is recognized by the wake-up circuit 162 as a wake-up command. The circuit 162 will then turn on the controller 160.

Once switched from the sleep to the active state, the HS1 signal is discontinued and the U_STALKL_ON signal is generated by the controller 160 to switch the transistor 150 "on" shown in FIG. 6 thereby enabling the voltages from the resistors on the circuit board 80 to be read directly through the terminals 280 and 282 to the controller 160 which will then activate the appropriate headlight commands based on the position of the actuator 32.

Alternately, the logic or gate 286 can be replaced by a NOR gate. In this case, the wake-up signal is a transition from a low voltage to a high voltage. The circuit 162 can be programmed to recognize this transition as a wake-up signal.

The make before break function of the contactor 78 and the switch pad shown in FIGS. 11 and 12 can also be implemented by providing the switch pads with generally parallel spaced edges and then forming the contactor with suitably shaped contact arms such that the contact arms will span the space between two adjacent switch pads while making contact for at least a brief instant with two adjacent switch pads.

What is claimed is:

1. In an electronic device having sleep and active states and a digital wake-up signal generating device for switching the electronic device from sleep to active states, the improvement comprising:

a printed circuit board with a ground conductive trace and at least two switch conductive traces;

a contactor bridging the ground and the switch conductive traces and moveable in engagement between switch traces by movement of an actuator coupled to the contactor;

resistor means coupled between the switch traces for producing a distinct analog voltage output when each switch trace is connected to ground by the contactor;

the switch traces alternatingly coupled through the resistor means to first and second outputs; and means, connected to the first and second outputs, for generating a wake-up command signal when both of the outputs are in a low voltage state.

2. The improvement of claim 1 wherein the wake-up command signal generating means comprises:

an OR gate coupled to the first and second outputs.

3. The improvement of claim 1 wherein:

the contactor and the switch conductive traces are arranged such that the contactor contacts a next adjacent switch trace before disengaging from a proceeding switch trace.

4. The improvement of claim 1 wherein:

the switch traces are one of linearly and circumferentially spaced apart.

5. A method for switching an electronic device having sleep and active states from a sleep state to an active state by generating a wake-up signal from a digital wake-up signal generating device, the method comprising the steps of:

providing a printed circuit board with a ground conductive trace and at least two switch conductive traces;

providing a contactor bridging the ground and the switch conductive traces and moveable in engagement between switch traces by movement of an actuator coupled to the contactor;

providing a resistor means coupled between the switch traces and producing a distinct analog voltage output when each switch trace is connected to ground by the contactor; and alternatingly connecting the switch traces through the resistor means to first and second outputs; and determining when the first and second outputs are both at a low voltage level to generate a wake-up command output signal.

6. The improvement of claim 4 wherein:

the determining means coincides with movement of the actuator coupled to the contactor between two distinct positions.

* * * * *